United States Patent
Wu et al.

(10) Patent No.: US 9,898,115 B2
(45) Date of Patent: Feb. 20, 2018

(54) TOUCH ELECTRODE LAYER

(71) Applicants: Tsang-Chih Wu, Hsinchu (TW); Tsung-Yen Chuang, Hsinchu County (TW); Yu-Fen Weng, Hsinchu County (TW); Fang-Nan Chu, Hsinchu (TW)

(72) Inventors: Tsang-Chih Wu, Hsinchu (TW); Tsung-Yen Chuang, Hsinchu County (TW); Yu-Fen Weng, Hsinchu County (TW); Fang-Nan Chu, Hsinchu (TW)

(73) Assignee: ITE TECH. INC., Hsinchu (TW)

( * ) Notice: Subject to any disclaimer, the term of this patent is extended or adjusted under 35 U.S.C. 154(b) by 0 days.

(21) Appl. No.: 14/876,836

(22) Filed: Oct. 7, 2015

(65) Prior Publication Data
US 2017/0024030 A1    Jan. 26, 2017

(30) Foreign Application Priority Data
Jul. 22, 2015    (TW) .............. 104211794 U

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2007/0229470 A1* | 10/2007 | Snyder | G06F 3/011 345/173 |
| 2010/0102941 A1* | 4/2010 | Richter | G06F 1/1626 340/407.2 |
| 2012/0075226 A1* | 3/2012 | Andoh | G06F 3/046 345/173 |
| 2013/0176236 A1* | 7/2013 | Ivanov | G06F 3/044 345/173 |
| 2016/0124554 A1* | 5/2016 | Lewis | G06F 3/044 345/174 |
| 2016/0202812 A1* | 7/2016 | Pyoun | G06F 3/0412 345/173 |
| 2016/0202826 A1* | 7/2016 | Han | G06F 1/16 345/174 |

* cited by examiner

*Primary Examiner* — Joseph Haley
*Assistant Examiner* — Emily Frank
(74) *Attorney, Agent, or Firm* — JCIPRNET

(57) ABSTRACT

A touch electrode layer includes a plurality of first touch electrodes and a plurality of second touch electrodes. The first touch electrodes are arranged to form a rectangle, wherein shapes of the first touch electrodes have the same size. The second touch electrodes are disposed around a periphery of the first touch electrodes. The second touch electrodes and the first touch electrodes are arranged to form a circle or a quasi-circle so as to define a circuit touch area or a quasi-circle touch area. A shape of each of the second touch electrodes is an arcuate triangle.

5 Claims, 6 Drawing Sheets

TOUCH ELECTRODE LAYER

CROSS-REFERENCE TO RELATED APPLICATION

This application claims the priority benefit of Taiwan application Ser. No. 104211794, filed on Jul. 22, 2015. The entirety of the above-mentioned patent application is hereby incorporated by reference herein and made a part of this specification.

BACKGROUND OF THE INVENTION

Field of the Invention

The invention relates to an electronic device layer, and more particularly, to a touch electrode layer.

Description of Related Art

In conventional touch panel, multi-touch electrodes are mostly designed as symmetrical, and a shape of the touch response area is mainly square, to assure effective touch sensitivity. However, when the design of a product requires a different external shape, such as a circle, oval, or polygon, usually a decorative shape without touch functions is additionally added to the square touch response area. Thus, besides the square touch response area, the peripheral area surrounding the touch response area usually does not have any touch functions.

SUMMARY OF THE INVENTION

The invention provides a touch electrode layer, having favorable touch sensitivity.

The touch electrode layer of the invention includes a plurality of first touch electrodes and a plurality of second touch electrodes. The first touch electrodes are arranged to form a rectangle, wherein shapes of the first touch electrodes have a same size. The second touch electrodes are disposed around a periphery of the first touch electrodes. The second touch electrodes and the first touch electrodes are arranged to form a circle or a quasi-circle so as to define a circle touch area or a quasi-circle touch area. A shape of each of the second touch electrodes is an arcuate triangle.

In an embodiment of the invention, the first touch electrodes are arranged to form a rectangle, and the rectangle is a square. The shapes of the second touch electrodes are symmetric to each other and have a same size, and the first touch electrodes and the second touch electrodes are arranged to form a circle so as to define a circle touch area.

In an embodiment of the invention, two diagonals of the square are respectively parallel to a horizontal axis and a vertical axis of the circle touch area.

In an embodiment of the invention, the first touch electrodes are arranged to form a rectangle, and the rectangle is an oblong. The shapes of the second touch electrodes are symmetric to each other and have two different sizes, and the first touch electrodes and the second touch electrodes are arranged to form a quasi-circle. The quasi-circle is an oval, so as to define an oval touch area.

In an embodiment of the invention, the first touch electrodes are arranged to form a rectangle, and the second touch electrodes are disposed around the periphery of the first touch electrodes and expose at least one side of the rectangle. The shapes of the second touch electrodes are symmetric to each other and have a same size, and the first touch electrodes and the second touch electrodes are arranged to form a quasi-circle so as to define a quasi-circle touch area.

The touch electrode layer of the invention includes a plurality of first touch electrodes and a plurality of second touch electrodes. The first touch electrodes are arranged to form a polygon, wherein shapes of the first touch electrodes have a same size. The second touch electrodes are disposed around a periphery of the first touch electrodes. The second touch electrodes and the first touch electrodes are arranged to form a circle so as to define a circle touch area. The second touch electrodes include a plurality of first arc-shaped touch electrodes and a plurality of second arc-shaped touch electrodes. An area of each of the first arc-shaped touch electrodes is greater than an area of each of the second arc-shaped touch electrodes. The first arc-shaped touch electrodes and the second arc-shaped touch electrodes are not connected to each other, and are alternately arranged.

In an embodiment of the invention, the second arc-shaped touch electrodes are disposed on a horizontal axis and a vertical axis of the circle touch area.

In an embodiment of the invention, a shape of each of the first touch electrodes is a square, and two diagonals of the square are respectively parallel to a horizontal axis and a vertical axis of the circle touch area.

The touch electrode layer of the invention includes a plurality of touch electrodes, arranged to form a polygon. A shape of each of the touch electrodes is a hexagon, and the shapes of the touch electrodes have the same size.

In an embodiment of the invention, the touch electrode layer further includes a plurality of auxiliary touch electrodes, arranged adjacent to the touch electrodes, so that outlines of at least two opposite sides of the polygon are respectively straight lines.

Based on the above, the touch electrode layer of the invention includes a plurality of first touch electrodes of the same shape and size, and a plurality of second touch electrodes with the shape of the arcuate triangle. The arrangement of the first touch electrodes and the second touch electrodes forms the circle or the quasi-circle, so as to define the circle touch area or the quasi-circle touch area. That is to say, the touch electrode layer of the invention includes a circle touch area or a quasi-circle touch area through two simple shapes of touch electrodes. Thus, the noise interference on a screen can be effectively reduced. In addition, the screen can have better position resolution and positioning precision.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
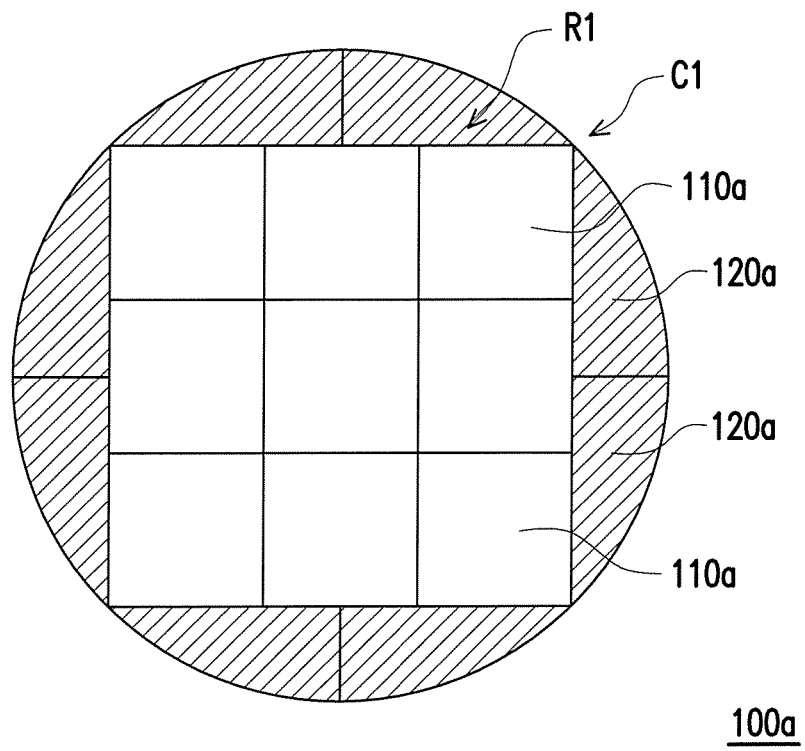
FIG. 1 is a schematic top view of a touch electrode layer according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

It should be noted that in the figures, because the touch electrodes are electrically conductive, the touch electrodes are not connected to each other. Rather, tiny gaps are located between the touch electrodes. However, in order to conveniently understand the invention, the figures have omitted showing the tiny gaps.

FIG. 1 is a schematic top view of a touch electrode layer according to an embodiment of the invention. Referring to FIG. 1, in the embodiment, the touch electrode layer 100a includes a plurality of first touch electrodes 110a and a plurality of second touch electrodes 120a. The first touch electrodes 110a are arranged to form a rectangle R1. Shapes of the first touch electrodes 110a have a same size. The second touch electrodes 120a are disposed around a periphery of the first touch electrodes 110a. The second touch electrodes 120a and the first touch electrodes 110a are arranged to form a circle, so as to define a circle touch area C1. A shape of each of the second touch electrodes 120a is an arcuate triangle.

In detail, a shape of each of the first touch electrodes 110a is a square, and the first touch electrodes 110a all have the same size and shape. Herein, a quantity of the first touch electrodes 110a is, for example nine, but is not limited thereto. The first touch electrodes 110a are arranged to form the rectangle R1. The rectangle R1 is, for example, a square. The second touch electrodes 120a surround a periphery of the square formed by the first touch electrodes 110a. In the embodiment, a shape of each of the second touch electrodes 120a is, for example, an arcuate triangle formed by two edges perpendicular to each other and connected by an arc. A quantity of the second touch electrodes is, for example, eight. Two adjacent and symmetric second touch electrodes 120a are adjacent to a side of the square formed by the first touch electrodes 110a. Through this configuration, the circle defining the circle touch area C1 is formed. Herein, the circle touch area C1 is a single layer touch electrode layer, which has the advantage of reduced costs.

The touch electrode layer 100a of the embodiment has the circle touch area formed through two simple shapes (i.e. the shapes of the first touch electrodes 110a are square and the shape of the second touch electrodes 120a are arcuate triangles). Thus, the touch electrode layer 100a formed only through touch electrodes with two simple shapes can effectively reduce noise interference of a screen. Furthermore, when calculating a touch position through an algorithm, only the surrounding arcuate triangles, the center squares, and the boundary between the arcuate triangles and squares need to be processed. This effectively reduces the complexity of the algorithm substantially, so as to have better position resolution and positioning precision. In addition, the touch electrode layer 100a has touch sensitivity within the circle touch area C1, and the size of the circle touch area C1 is not limited to design restrictions. Additionally, the touch electrode layer 100a of the embodiment is suitable for multi-touch, and can provide a user-friendly operating mode.

It should be noted that the following embodiments utilize the same reference numbers and partial description of the previous embodiment. Same reference numbers are used to represent same or similar elements, and repetitive explanation of the same description is omitted. The detailed description of the omitted portions can be referred to in the previous embodiment, and will not be repeated in the following embodiments.

Figure 2:
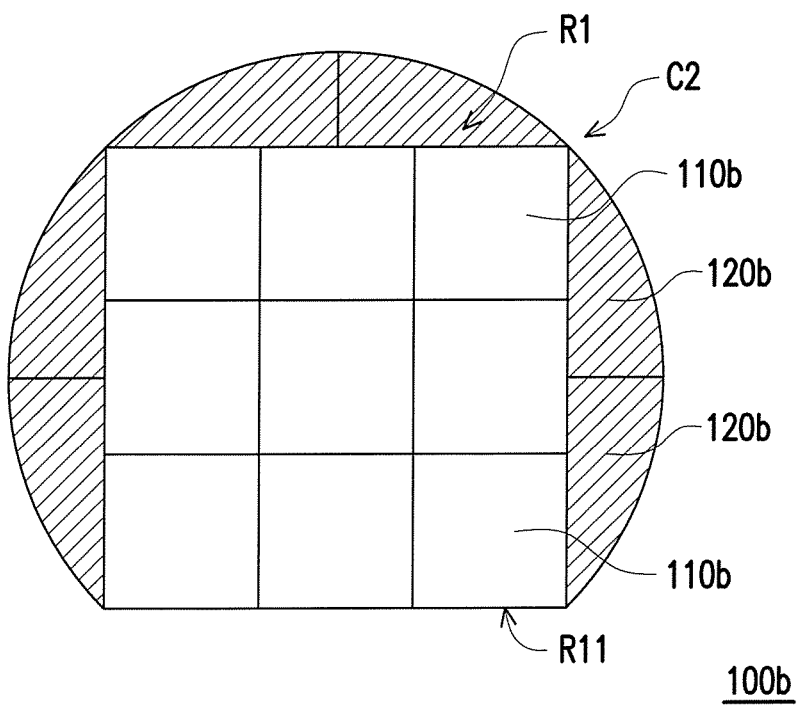
FIG. 2 is a schematic top view of a touch electrode layer according to another embodiment of the invention.

FIG. 2 is a schematic top view of a touch electrode layer according to another embodiment of the invention. Referring to FIG. 1 and FIG. 2, the touch electrode layer 100b of the embodiment is similar to the touch electrode layer 100a of the FIG. 1. The difference between the two is that the second touch electrodes 120b of the touch electrode layer 100b disposed around the first touch electrodes 110b expose one side R11 of the square (i.e. the rectangle R1). The first touch electrodes 110b and the second touch electrodes 120b are arranged to form a quasi-circle, so as to define a quasi-circle touch area C2. That is to say, compared to the touch electrode layer 100a of FIG. 1, the design of the touch electrode layer 100b of the embodiment has two less second touch electrodes 120b, so as to satisfy an external appearance of a product required by a user. In addition, regarding other embodiments that are not shown, one of ordinary skill in the art can adjust the quantities and positions of the first touch electrodes 110b and the second touch electrodes 120b according to the pattern required by the touch area, so as to achieve a design requirement or effect.

Figure 3:
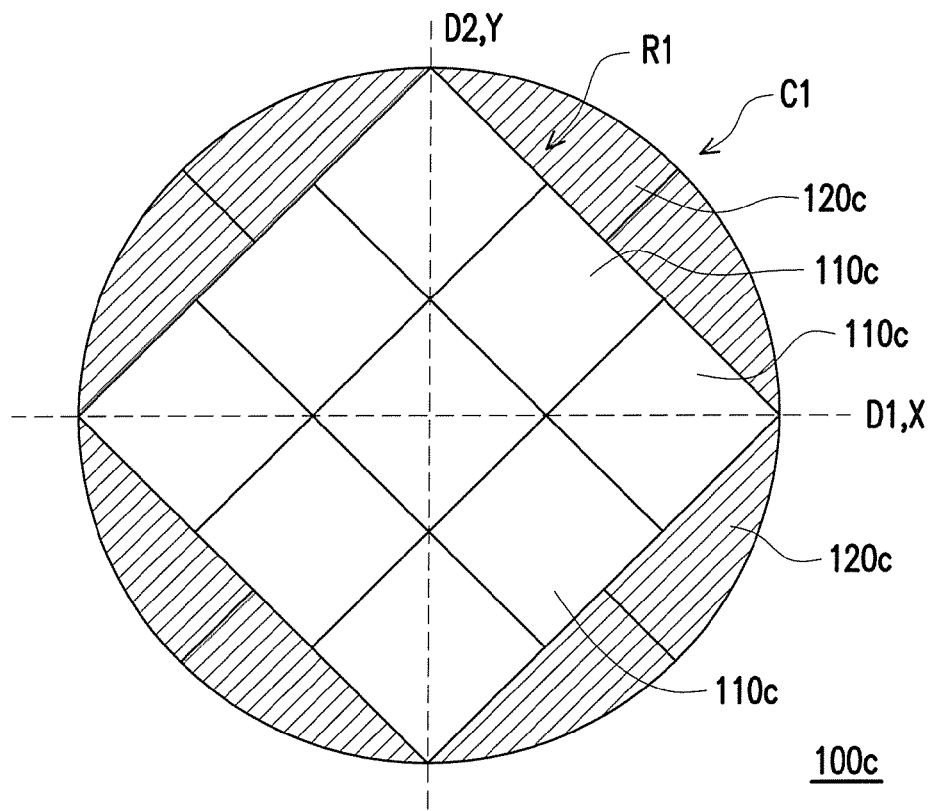
FIG. 3 is a schematic top view of a touch electrode layer according to yet another embodiment of the invention.

FIG. 3 is a schematic top view of a touch electrode layer according to yet another embodiment of the invention. Referring to FIG. 1 and FIG. 3, the touch electrode layer 100c of the embodiment is similar to the touch electrode layer 100a of the FIG. 1. The difference between the two is that the embodiment has arranged the first touch electrodes 110c to be a square (i.e. the rectangle R1), and the two diagonals D1, D2 of the square are respectively parallel to a horizontal axis X and a vertical axis Y of the circle touch area C1. This way, the touch electrode layer 100c of the embodiment reduces diffraction in a screen. That is to say, compared to the square formed by the first touch electrodes 110a of FIG. 1, the square formed by the arrangement of the first touch electrodes 110c of the embodiment are rotated by an angle. In other words, the touch electrode layer 100c of the embodiment rotates the square formed by the first touch electrodes 110c, so that the goal of reducing diffraction of the screen can be effectively achieved.

Figure 4:
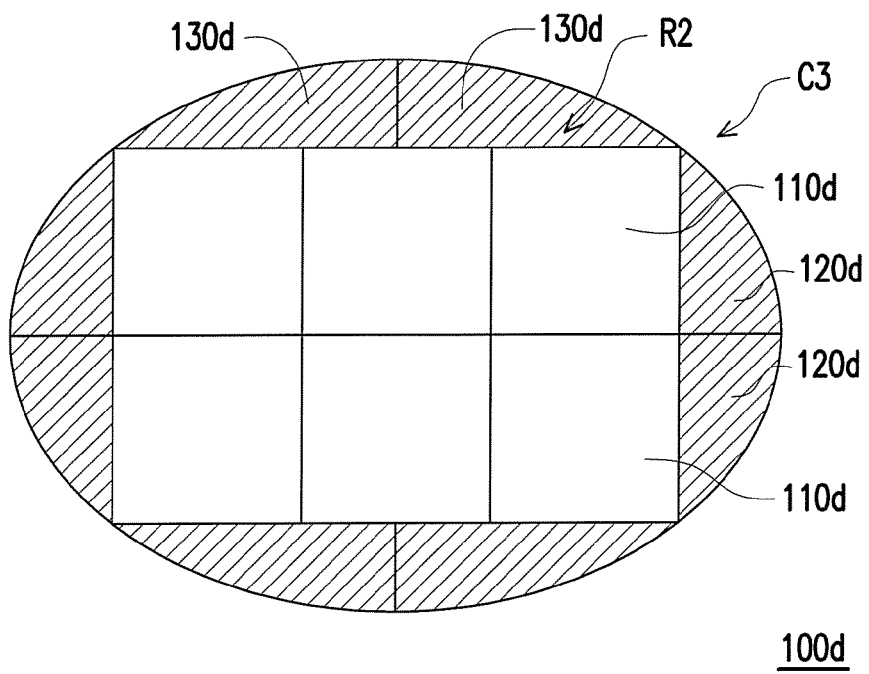
FIG. 4 is a schematic top view of a touch electrode layer according to yet another embodiment of the invention.

FIG. 4 is a schematic top view of a touch electrode layer according to yet another embodiment of the invention. Referring to FIG. 1 and FIG. 4, the touch electrode layer 100d of the embodiment is similar to the touch electrode layer 100a of the FIG. 1. The difference between the two is that in the embodiment, a quantity of the first touch electrodes 110d is, for example six. The first touch electrodes 110d form a rectangle R2, and the rectangle R2 is an oblong. The shape of the second touch electrodes 120d, 130d are symmetric to each other and have two different sizes. The first touch electrodes 110*d* and the second touch electrodes 120*d*, 130*d* are arranged to form a quasi-circle. The quasi-circle is an oval, so as to define an oval touch area C3. That is to say, the second touch electrodes 120*d*, 130*d* of the embodiment have shapes that are the same or symmetric to each other but have different sizes. Through this design and arrangement with the oblong formed by the first touch electrodes 110*d*, the oval touch area C3 is defined.

Figure 5:
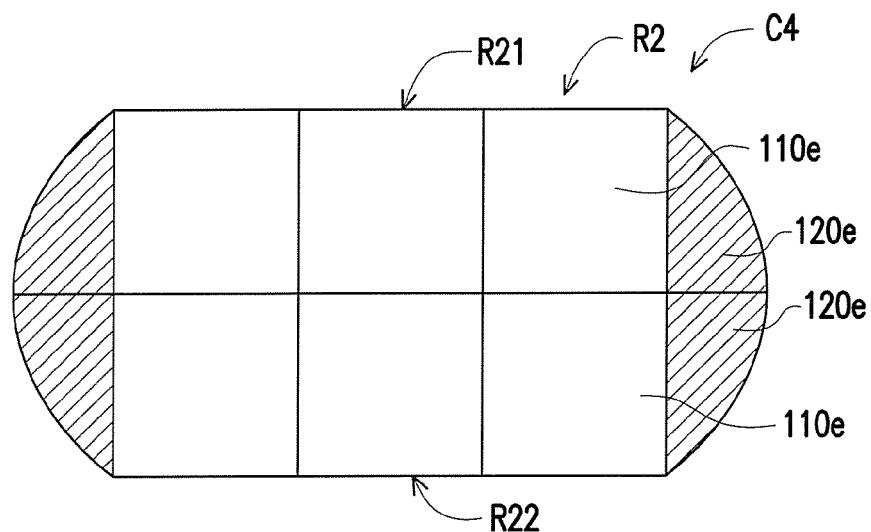
FIG. 5 is a schematic top view of a touch electrode layer according to yet another embodiment of the invention.

FIG. 5 is a schematic top view of a touch electrode layer according to yet another embodiment of the invention. Referring to FIG. 4 and FIG. 5, the touch electrode layer 100*e* of the embodiment is similar to the touch electrode layer 100*d* of the FIG. 4. The difference between the two is that in the embodiment, the second touch electrodes 120*e* disposed around a periphery of the first touch electrodes 110*e* expose two opposite sides R21, R22 of the oblong (i.e. the rectangle R2). Herein, the shape of the second touch electrodes 120*e* are symmetric to each other and have a same size, and the first touch electrodes 110*e* and the second touch electrodes 120*e* are arranged to form a quasi-circle so as to define a quasi-circle touch area C4. That is to say, compared to the touch electrode layer 100*d* of FIG. 4, the design of the touch electrode layer 100*e* of the embodiment has four less second touch electrodes 130*d*, so as to satisfy an external appearance of a product required by a user. In addition, regarding other embodiments that are not shown, one of ordinary skill in the art can adjust the quantities and positions of the first touch electrodes 110*e* and the second touch electrodes 120*e* according to the pattern required by the touch area, so as to achieve a design requirement or effect.

Figure 6:
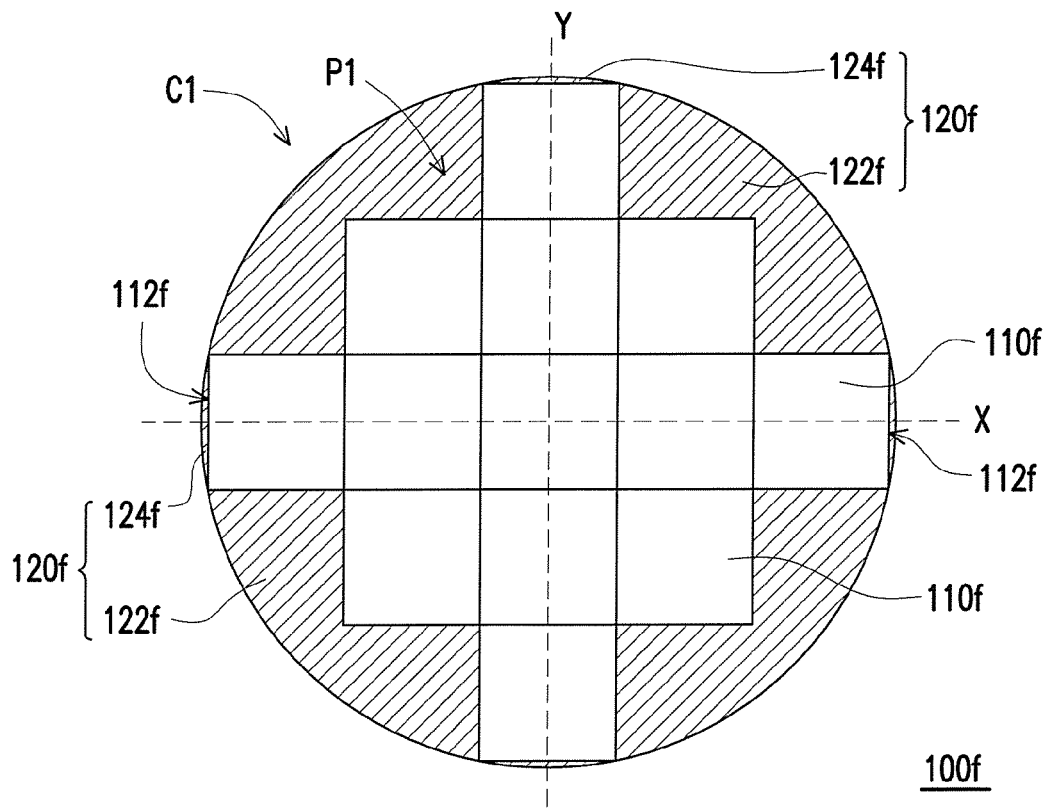
FIG. 6 is a schematic top view of a touch electrode layer according to yet another embodiment of the invention.

FIG. 6 is a schematic top view of a touch electrode layer according to yet another embodiment of the invention. Referring to FIG. 6, in the embodiment, the touch electrode layer includes a plurality of first touch electrodes 110*f* and a plurality of second touch electrodes 120*f*. The first touch electrodes 110*f* are arranged to form a polygon P1. Shape of the first touch electrodes 110*f* have a same size. The second touch electrodes 120*f* are disposed around a periphery of the first touch electrodes 110*f*. The second touch electrodes 120*f* and the first touch electrodes 110*f* are arranged to be a circle so as to define a circle touch area C1. The second touch electrodes 120*f* include a plurality of first arc-shaped touch electrodes 122*f* and a plurality of second arc-shaped touch electrodes 124*f*. An area of each of the first arc-shaped touch electrodes 122*f* is greater than an area of each of the second arc-shaped touch electrodes 124*f*. The first arc-shaped touch electrodes 122*f* and the second arc-shaped touch electrodes 124*f* are not connected to each other, and are alternately arranged.

In detail, in the embodiment, a quantity of the first touch electrodes 110*f* is, for example thirteen. A quantity of the first arc-shaped touch electrodes 122*f* is, for example four. A quantity of the second arc-shaped touch electrodes 124*f* is, for example, four. However, the invention is not limited thereto. A shape of each of the first touch electrodes 110*f* is square. The second arc-shaped touch electrodes 124*f* are located on a horizontal axis X and a vertical axis Y of the circle touch area C1. Each of the second arc-shaped touch electrodes 124*f* is arranged corresponding to a side 112*f* of one of the first touch electrodes 110*f*. The first arc-shaped touch electrodes 122*f*, the second arc-shaped touch electrodes 124*f*, and the first touch electrodes 110*f* are arranged to define a circle touch area C1. Thus, in the embodiment, the touch electrode layer 100*f* has touch sensitivity within the circle touch area C1, and the size of the circle touch area C1 is not limited to design restrictions. Additionally, the touch electrode layer 100*f* of the embodiment is suitable for dual-touch, and can provide a user-friendly operating mode. In addition, the touch electrode layer 100*f* has the advantage of better positioning precision.

Figure 7:
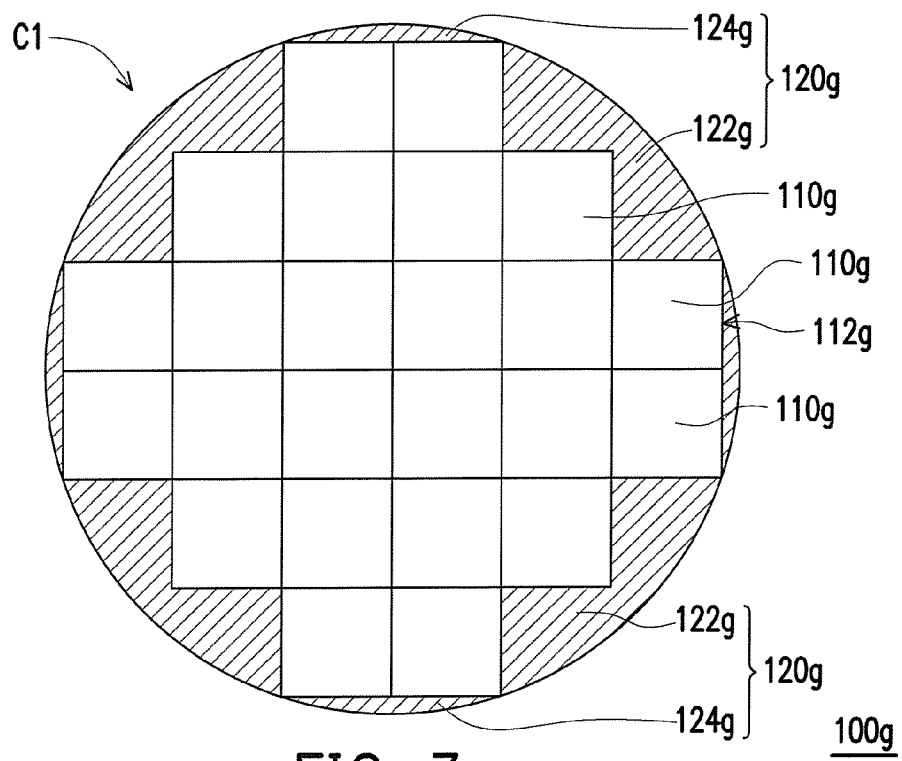
FIG. 7 is a schematic top view of a touch electrode layer according to yet another embodiment of the invention.

FIG. 7 is a schematic top view of a touch electrode layer according to yet another embodiment of the invention. Referring to FIG. 6 and FIG. 7, the touch electrode layer 100*g* of the embodiment is similar to the touch electrode layer 100*f* of the FIG. 6. The difference between the two is that in the embodiment, the quantity of the first touch electrodes 110*g* is, for example, 24. In detail, each of the second arc-shaped touch electrodes 124*g* is arranged corresponding to a side 112*g* of two of the first touch electrodes 110*g*. The first arc-shaped touch electrodes 122*g*, the second arc-shaped touch electrodes 124*g*, and the first touch electrodes 110*g* are arranged to define a circle touch area C1. That is to say, the dimensions of the first touch electrodes 110*g* of the embodiment are smaller than then dimension of the first touch electrodes 110*f* of FIG. 6. Thus, production cost can be reduced and touch sensitivity can be improved.

Figure 8:
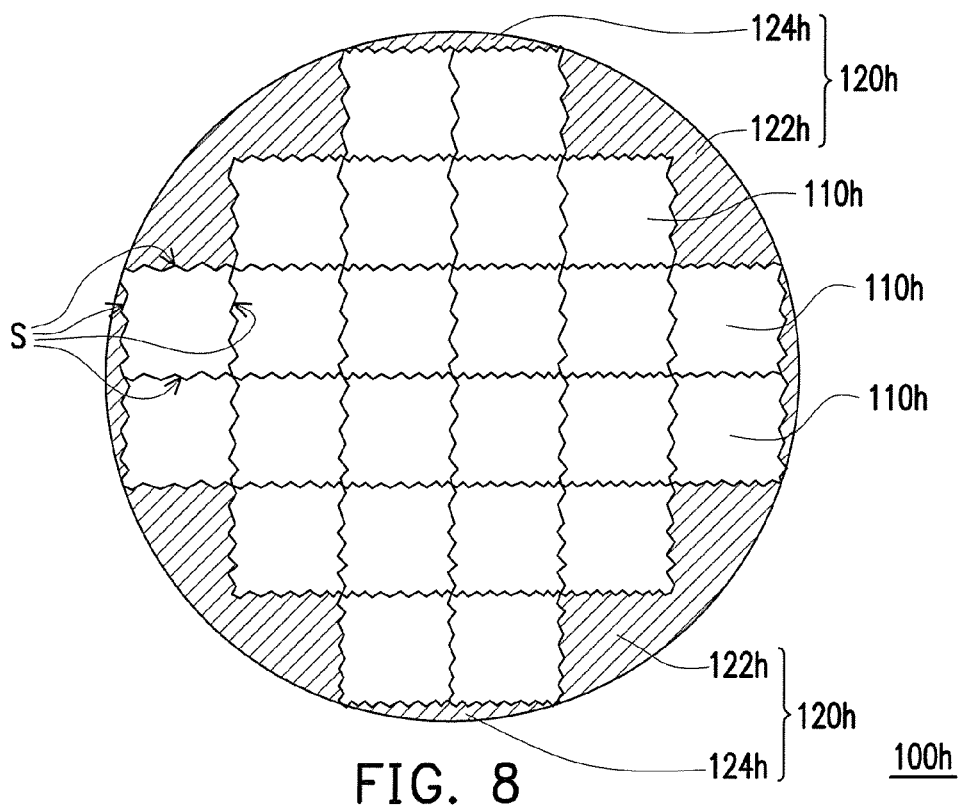
FIG. 8 is a schematic top view of a touch electrode layer according to yet another embodiment of the invention.

FIG. 8 is a schematic top view of a touch electrode layer according to yet another embodiment of the invention. Referring to FIG. 7 and FIG. 8, the touch electrode layer 100*h* of the embodiment is similar to the touch electrode layer 100*g* of FIG. 7. The difference between the two is that a shape of each of the first touch electrodes 110*h* is square, and each square has four surfaces S. The first arc-shaped touch electrodes 122*h* and the second arc-shaped touch electrodes 124*h* of the second touch electrodes 120*h* are mutually arranged with the surfaces S of the first touch electrodes 110*h* to define a circle touch area. The design of the surfaces S of the first touch electrodes 110*h* may effectively reduce diffraction of a screen.

Figure 9:
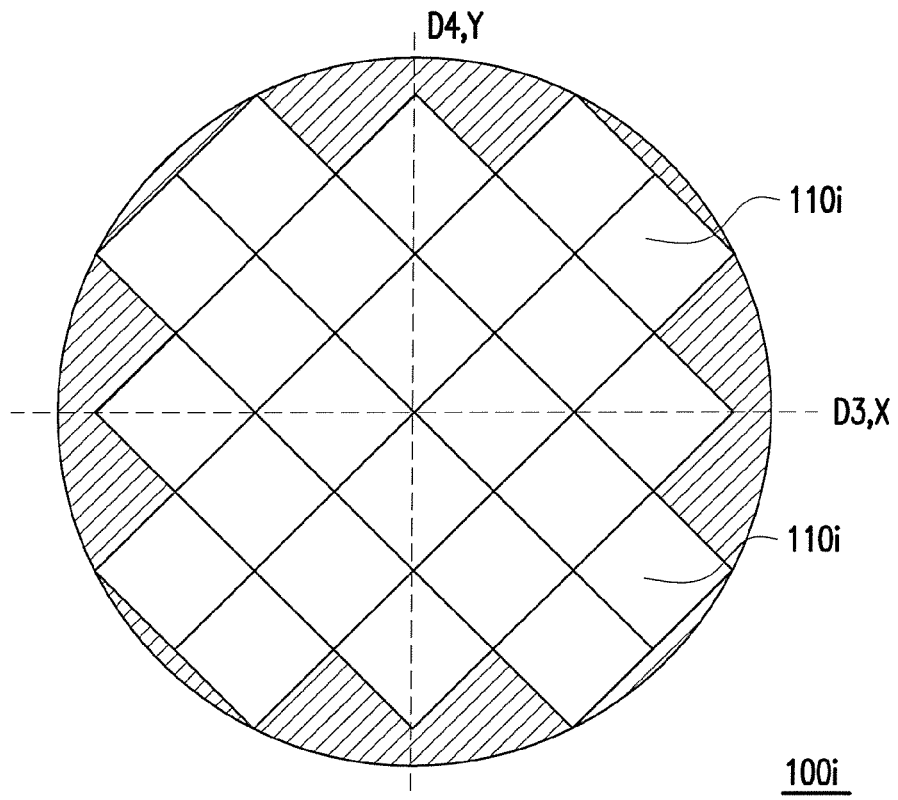
FIG. 9 is a schematic top view of a touch electrode layer according to yet another embodiment of the invention.

FIG. 9 is a schematic top view of a touch electrode layer according to yet another embodiment of the invention. Referring to FIG. 7 and FIG. 9, the touch electrode layer 100*i* of the embodiment is similar to the touch electrode layer 100*g* of the FIG. 7. The difference between the two is that in the embodiment, in order to lower diffraction in a screen, the circle formed by the first touch electrodes 110*g* of the touch electrode layer 100*g* of FIG. 7 is rotated an angle, as seen in FIG. 9. This way, the two diagonals D3, D4 of each of the first touch electrodes 110*i* are respectively parallel to a horizontal axis X and a vertical axis Y of the circle touch area C1. In other words, the touch electrode layer 100*i* of the embodiment rotates the circle formed by the first touch electrodes 110*g* of FIG. 7, so that the goal of reducing diffraction of the screen can be effectively achieved.

Figure 10:
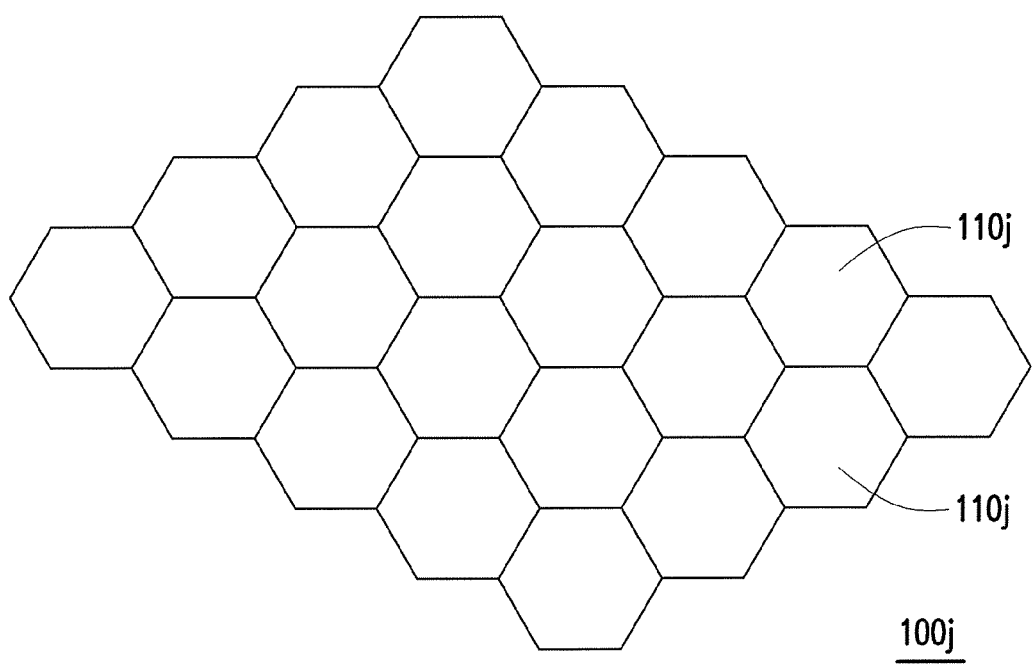
FIG. 10 is a schematic top view of a touch electrode layer according to yet another embodiment of the invention.

FIG. 10 is a schematic top view of a touch electrode layer according to yet another embodiment of the invention. In the embodiment, please refer to FIG. 10. The touch electrode layer 100*j* includes a plurality of touch electrodes 110*j*. The touch electrodes 110*j* are arranged to form a polygon, such as a parallelogram. In detail, a shape of each of the touch electrodes 110*j* is a hexagon, and the touch electrodes 110*j* all have the same size and shape. The touch electrode layer 100*j* only has one type of electrode pattern in the touch electrodes 110*j*, and the touch electrodes 110*j* may be arranged arbitrarily to form polygons of different shapes. Thus, the touch area formed may also be a polygon. This effectively increases the options available for a design of an external appearance of a product. In addition, the touch area in the shape of the polygon has a touch sensing function.

Figure 11:
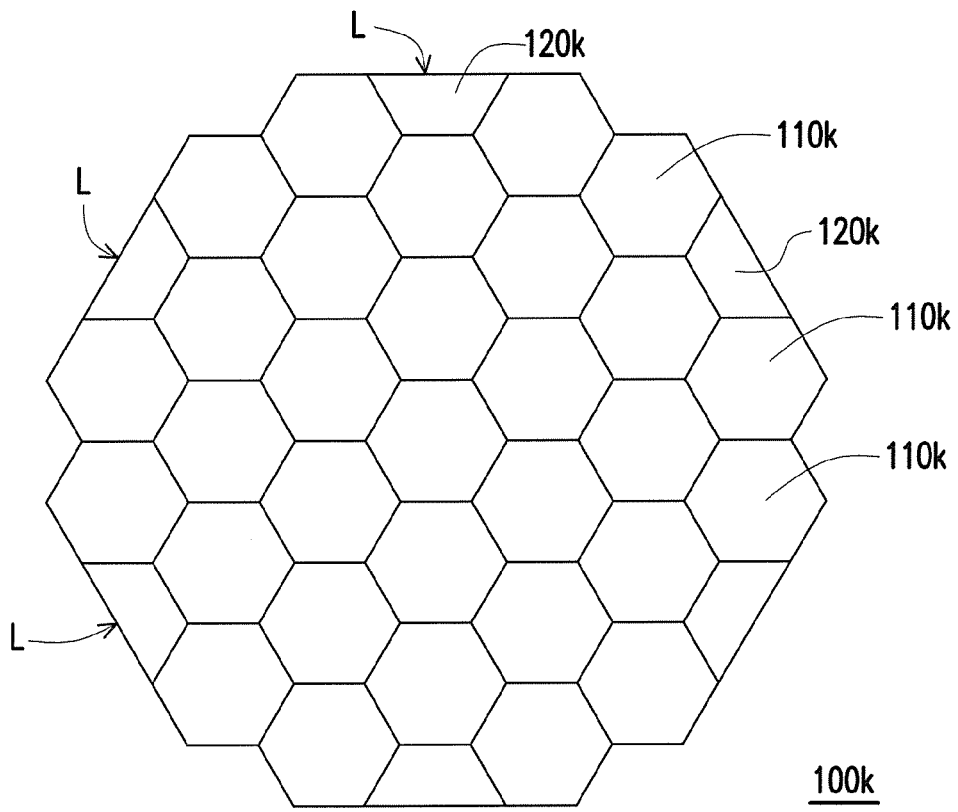
FIG. 11 is a schematic top view of a touch electrode layer according to yet another embodiment of the invention.

FIG. 11 is a schematic top view of a touch electrode layer according to yet another embodiment of the invention. Referring to FIG. 10 and FIG. 11, the touch electrode layer 100*k* of the embodiment is similar to the touch electrode layer 100*j* of the FIG. 10. The difference between the two is that the embodiment further includes a plurality of auxiliary touch electrodes 120*k*. The auxiliary touch electrodes 120*k* are arranged adjacent to the touch electrodes 110*k*, so that outlines of at least two opposite sides of the polygon are respectively straight line L. Herein, a shape of each of the auxiliary touch electrodes 120*k* is, for example, a trapezoid (half of the hexagon). As seen in FIG. 11, three sides of the auxiliary touch electrodes 120*k* are respectively located on a side of three touch electrodes 110*k*. Thus, the touch electrodes 110*k* and the auxiliary touch electrodes 120*k* are able to form a polygon having an outline with a side that is the straight line L.

The touch electrode layer 100*a* of the embodiment has a polygon touch area formed through two simple shapes (i.e. the spates of the touch electrodes 110*k* are hexagons and the shapes of the auxiliary touch electrodes 120*k* are trapezoids). Thus, the touch electrode layer 100*k* formed only through touch electrodes with two simple shapes can effectively reduce noise interference of a screen. Furthermore, when calculating a touch position through an algorithm, the complexity of the algorithm is reduced substantially, so as to have better position resolution and positioning precision. In addition, the touch electrode layer 100*k* has touch sensitivity within the polygon touch area. The design of the polygon touch area increases the options available for a design of an external appearance of a product.

Figure 12:
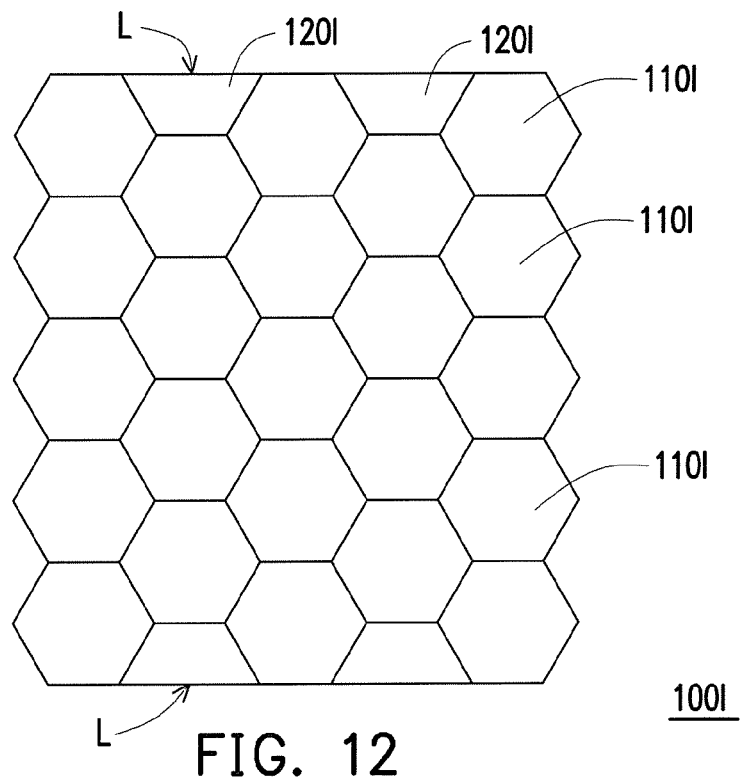
FIG. 12 is a schematic top view of a touch electrode layer according to yet another embodiment of the invention.

FIG. 12 is a schematic top view of a touch electrode layer according to yet another embodiment of the invention. Referring to FIG. 11 and FIG. 12, the touch electrode layer 100*l* of the embodiment is similar to the touch electrode layer 100*k* of the FIG. 11. The difference between the two is that in the embodiment, the touch electrodes 110*l* and the auxiliary touch electrodes 120*l* are arranged to form a polygon with parallel straight lines L.

To sum up, the touch electrode layer of the invention includes a plurality of first touch electrodes with the same shape and size, and a plurality of second touch electrodes with the shape of the arcuate triangle. The arrangement of the first touch electrodes and the second touch electrodes forms the circle or the quasi-circle, so as to define the circle touch area or the quasi-circle touch area. That is to say, the touch electrode layer of the invention includes the circle touch area or the quasi-circle touch area through two simple shapes of touch electrodes. Thus, the noise interference on a screen can be effectively reduced. In addition, the screen can have better position resolution and positioning precision. Furthermore, the touch electrode layer of the invention has touch sensitivity within the circle touch area or quasi-circle touch area. The touch electrode layer has multi-touch functions, and can provide a user-friendly operating mode. In addition, the touch electrode layer formed through touch electrodes shaped as hexagons has a polygon shape. The design of the polygon touch area increases the options available for a design of an external appearance of a product.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch electrode layer, comprising:
a plurality of first touch electrodes, arranged to form a rectangle, wherein shapes of the first touch electrodes have a same size; and
a plurality of second touch electrodes, disposed around a periphery of the first touch electrodes, wherein the second touch electrodes and the first touch electrodes are arranged to form a circle or a quasi-circle, so as to define a circle touch area or a quasi-circle touch area, wherein a shape of each of the second touch electrodes is an arcuate triangle, and
wherein two adjacent and symmetric second touch electrodes are adjacent to a side of the rectangle formed by the first touch electrodes.

2. The touch electrode layer as claimed in claim 1, wherein the first touch electrodes are arranged to form the rectangle, and the rectangle is a square, wherein the shapes of the second touch electrodes are symmetric to each other and have a same size, and the first touch electrodes and the second touch electrodes are arranged to form the circle so as to define the circle touch area.

3. The touch electrode layer as claimed in claim 2, wherein two diagonals of the square are respectively parallel to a horizontal axis and a vertical axis of the circle touch area.

4. The touch electrode layer as claimed in claim 1, wherein the first touch electrodes are arranged to form the rectangle, and the rectangle is an oblong, wherein the shapes of the second touch electrodes are symmetric to each other and have two different sizes, and the first touch electrodes and the second touch electrodes are arranged to form the quasi-circle, wherein the quasi-circle is an oval, so as to define an oval touch area.

5. The touch electrode layer as claimed in claim 1, wherein the first touch electrodes are arranged to form the rectangle, and the second touch electrodes are disposed around the periphery of the first touch electrodes and expose at least one side of the rectangle, wherein the shapes of the second touch electrodes are symmetric to each other and have a same size, and the first touch electrodes and the second touch electrodes are arranged to form the quasi-circle so as to define the quasi-circle touch area.

* * * * *